SEMI-CONDUCTOR OSCILLATORS

Filed Aug. 31, 1949 2 Sheets-Sheet 1

Inventors
Richard O. Endres
& Everett Eberhard
By
H. L. Newton
Attorney

April 5, 1960 R. O. ENDRES ET AL 2,931,898

SEMI-CONDUCTOR OSCILLATORS

Filed Aug. 31, 1949 2 Sheets-Sheet 2

Inventors
Richard O. Endres
& Everett Eberhard

By

Attorney

United States Patent Office 2,931,898

Patented Apr. 5, 1960

2,931,898

SEMI-CONDUCTOR OSCILLATORS

Richard O. Endres, Audubon, and Everett Eberhard, Haddonfield, N.J., assignors to Radio Corporation of America, a corporation of Delaware Application August 31, 1949, Serial No. 113,262

15 Claims. (Cl. 250—20)

This invention relates generally to oscillators and particularly to oscillators of the semi-conductor type.

The three-electrode semi-conductor has recently been developed as an amplifier or oscillator. This device, which has been termed a "transistor," has been disclosed in a series of three letters to the Physical Review by Bardeen and Brattain, Brattain and Bardeen, and Shockley and Pearson which appear on pages 230 to 233 of the July 15, 1948, issue. The new amplifier includes a block of a semi-conducting material such as silicon or germanium which is provided with two closely adjacent point electrodes called "emitter" and "collector" electrodes in contact with one surface region of the material, and a "base" electrode which provides a large-area, low-resistance contact with another surface region of the semi-conducting material. This amplifier provides voltages as well as current gain under proper operating conditions and may be considered as a three-terminal network having a common input and output terminal. Thus, the device is effectively a four-terminal network having a common input and output electrode which may, for example, be the base electrode.

It has been found that a semi-conductor device exhibits negative resistance under certain operating conditions. This negative resistance appears when looking into the base electrode of the device. The oscillators of the present invention make use of this negative resistance and in addition, an external feedback path may in some cases be provided.

It is accordingly, a principal object of the present invention to provide novel oscillators including a three-electrode semi-conductor device which make use of the negative resistance of the device.

Another object of the invention is to provide self-quenching semi-conductor oscillators which, when modified, may be used as a super-regenerative detector.

A further object of the invention is to provide novel relaxation oscillators of the semi-conductor type from which either saw-tooth waves or electric pulses may be obtained.

Still another object of the invention is to provide novel sine wave oscillators of the semi-conductor type which will oscillate at higher frequencies than previously known semi-conductor oscillators.

A self-quenching oscillator in accordance with the present invention comprises a three-electrode semi-conductor amplifier having an emitter electrode, a collector electrode, and a base electrode. The emitter and collector electrodes may be considered as rectifying electrodes having a relatively large contact resistance with the semi-conducting crystal. The base electrode is a non-rectifying electrode which normally has a relatively low contact resistance with the semi-conducting crystal. A resistor is provided between a bias battery and the collector electrode. A capacitor is connected in parallel with the resistor and the battery. Accordingly, the capacitor is slowly charged by the battery through the resistor. The capacitor is then suddenly discharged by the amplifier, and the time constant of the resistor and capacitor determine the quench frequency of the oscillator. A parallel resonant circuit is coupled to the base electrode and its resonant frequency determines the frequency of the output wave. During each quenching cycle, a sinusoidal wave builds up in the parallel resonant circuit and eventually decays again.

It is also feasible to provide an external feedback path between the parallel resonant circuit and the emitter electrode. This will provide more vigorous oscillation. Alternatively, the resistor and capacitor may be provided in the external emitter lead. The operation of this self-quenching oscillator is substantially the same.

If an amplitude-modulated carrier wave having a frequency equal to the resonant frequency of the resonant circuit is impressed on the resonant circuit, a super-regenerative detector is obtained. Such a detector may be used as a super-regenerative receiver. If the carrier wave impressed on the resonant circuit is not modulated and if its frequency differs from the resonant frequency of the circuit, a quenched oscillator is obtained and the quench frequency is determined by the difference between the resonant frequency of the resonant circuit and the frequency of the impressed carrier wave.

If the parallel resonant circuit is replaced by a resistor and if the resistor and capacitor are provided in the external emitter lead instead of in the collector lead, a novel relaxation oscillator is obtained. This relaxation oscillator may be triggered or synchronized by pulses impressed upon any one of the three electrodes of the semi-conductor device.

If the oscillator is only provided with a parallel resonant circuit coupled to its base electrode, a sine wave oscillator is obtained. This sine wave oscillator may be provided with an external feedback path to the emitter. In order to provide oscillations at higher frequencies, a phase shift network may be provided in either the emitter lead or in the collector lead. This phase shift network will correct the normally occurring phase shift between the alternating input and output currents at the resonant frequency of the resonant circuit.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1:
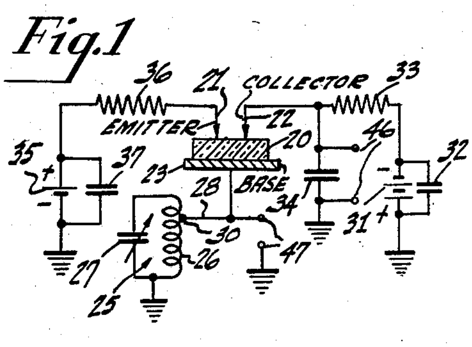
Figure 1 is a circuit diagram of a self-quenching oscillator embodying the present invention.

Referring now to the drawing in which like components have been designated by the same reference numerals throughout the figures, and particularly to Figure 1, there is illustrated a semiconductor oscillator. The oscillator comprises a semi-conductor device having a block or body 20 of semi-conducting material consisting, for example, essentially of a chemical element having semi-conducting properties such as germanium, silicon, boron, tellurium or selenium containing a small but sufficient number of atomic impurity centers or lattice imperfections as commonly employed for best results in crystal rectifiers. Germanium is the preferred material for block 20 and may be prepared so as to be an electronic N type semi-conductor crystal as is well known. The top surface of semi-conducting block 20 may be polished and etched in the manner explained in the paper by Bardeen and Brattain referred to. It is also feasible to utilize the germanium block from a commercial high-back-voltage germanium rectifier such as the type 1N34.

Semi-conducting body 20 is provided with emitter electrode 21, collector electrode 22 and base electrode 23. Emitter electrode 21 and collector electrode 22 usually form small-area contacts with semi-conducting body 20 and may consist, for example, of point electrodes of tungsten or Phosphor-bronze wires having a diameter of 2 to 5 mils and spaced apart less than 5 mils and preferably about 2 mils. Although emitter electrode 21 and collector electrode 22 are normally point electrodes, it is only essential that they be rectifying electrodes having a relatively high contact resistance with body 20. Emitter electrode 21 and collector electrode 22 may be provided on the same surface of semi-conducting body 20 or they may be arranged on opposite surfaces of semi-conducting body 20 spaced apart a few mils. Base electrode 23 normally forms a relatively low resistance contact with the bulk of semi-conducting body 20 and usually has a relatively large contact area with body 20. Base electrode 23 is a non-rectifying electrode.

Figure 8:
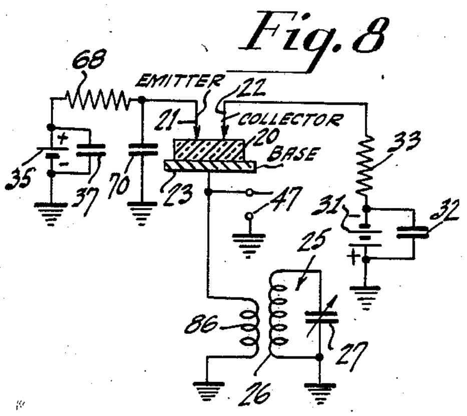
Figure 8 is a circuit diagram of a modification of a self-quenching oscillator in accordance with the invention.

Base electrode 23 is coupled to parallel resonant circuit 25 including inductor 26 and capacitor 27 which may be variable as shown. Base electrode 23 may be connected to parallel resonant circuit 25 through lead 28 connected to tap 30 on inductor 26. Tap 30 preferably is provided on the upper portion of inductor 26 for the purpose of matching impedances between resonant circuit 25 and base electrode 23. Parallel resonant circuit 25 may also be inductively coupled to base electrode 23 as illustrated in Figure 8 and which will be explained in more detail hereinafter.

Collector electrode 22 is supplied with a relatively large reverse bias voltage. To this end, battery 31 is provided which has its positive terminal grounded. Battery 31 is shunted by alternating current by-pass capacitor 32. Resistor 33 is connected between collector electrode 22 and the negative terminal of battery 31. Capacitor 34 is connected between collector electrode 22 and ground, that is, it effectively shunts resistor 33.

A comparatively small forward bias voltage is applied to emitter electrode 21. To this end battery 35 has its negative terminal grounded while its positive terminal is connected to emitter electrode 21 through resistor 36. Battery 35 is shunted by alternating current bypass capacitor 37. The terms "forward bias voltage" and "reverse bias voltage" as used above and hereafter in the specification and claims are to be given their usual meanings in this art. Thus, a "forward bias voltage" means a voltage which is applied to semi-conducting material with a polarity to provide easy current flow or in the current conducting direction. A "reverse bias voltage" means a voltage which is applied with a polarity to oppose easy current flow or in a direction for which there is substantially no current conduction.

Figure 2:
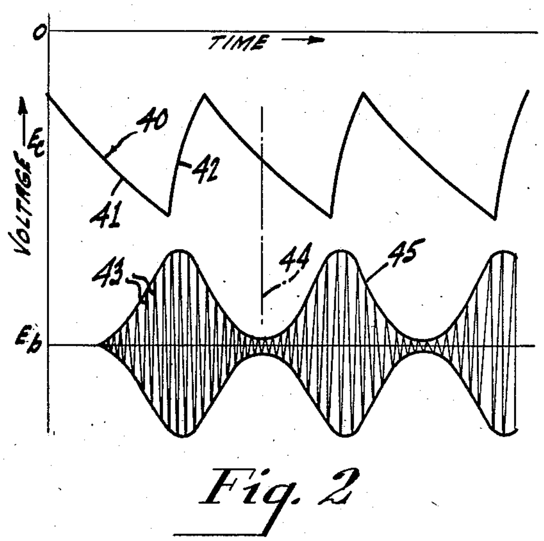
Figure 2 is a graph illustrating voltage curves which will be referred to in explaining the operation of the oscillator of Figure 1.

The operation of the self-quenching oscillator of Figure 1 may be explained as follows. Let it be assumed that resonant circuit 25 is replaced by a resistor. In that case, the oscillator functions as a relaxation oscillator of the type disclosed and claimed in the copending application to Everett Eberhard, filed on January 4, 1949, Serial No. 70,661, entitled "Relaxation Oscillators," and assigned to the assignee of this application. The theory of operation of this relaxation oscillator has also been explained in a paper by Webster, Eberhard and Barton which appears on pages 5 to 16 of the March, 1949, issue of RCA Review (see pages 14 to 16). Curve 40 of Figure 2 illustrates the collector voltage $E_c$ of the oscillator of Figure 1 plotted with respect to time. Capacitor 34 is slowly charged from battery 31 through resistor 33. During that time, the potential across capacitor 34 slowly increases in a negative direction as shown by curve portion 41. Eventually capacitor 34 and consequently collector electrode 22 will acquire a negative potential of such a magnitude that the oscillator now behaves like a negative resistance device. In that case, current amplification takes place and capacitor 34 is rapidly discharged as shown by curve portion 42. A complete cycle of curve 40 is determined by the time constant of resistor 33 and capacitor 34.

Let it now be assumed that capacitor 34 is omitted in the circuit of Figure 1. In that case the circuit of Figure 1 will function as a sine wave oscillator. This type of oscillator has been disclosed and claimed in a copending application to Everett Eberhard, filed on January 28, 1949, Serial No. 73,352, entitled "Sine Wave Oscillators," and assigned to the assignee of this application. The theory of this sine wave oscillator has also been explained in the paper by Webster, Eberhard and Barton above referred to (page 14). It is well known that the reactive impedance of a parallel resonant circuit such as 25 is infinite at the resonant frequency. Accordingly, a high impedance is provided between base electrode 23 and ground. Under these conditions, the circuit will oscillate due to its inherent negative resistance as explained in the paper referred to. The frequency of oscillation is determined by the resonant frequency of circuit 25 as well as by the applied bias voltages.

The self-quenching oscillator of Figure 1 combines the features of the sine wave oscillator and of the relaxation oscillator above referred to. Thus the base voltage $E_b$ shown by curve 43 of Figure 2 will be a sine wave of a frequency determined by the resonant frequency of circuit 25. It is now believed that at some point, indicated by line 44 of Figure 2, oscillation is initiated in resonant circuit 25 due to noise or other transient voltages. The amplitude of the oscillating wave given by envelope 45 will slowly increase until the point of low frequency regeneration of the oscillator is obtained. At this instant, capacitor 34 will suddenly be discharged through collector electrode 22 and base electrode 23 in the manner previously explained. Actually, as clearly shown by curve 45, the oscillation continues to build up for short periods of time during the discharge cycle but eventually it will decrease again.

Oscillation in resonant circuit 25 may cease entirely or the sinusoidal wave 43 may be continuous as shown in Figure 2. This will depend on the circuit constants, on the Q of resonant circuit 25 and on the time constant of resistor 33 and capacitor 34. The quench frequency should be considerably below the resonant frequency of circuit 25. In other words, the time constant of resistor 33 and capacitor 34 should be longer than the reciprocal of the resonant frequency of resonant circuit 25 in order to provide self-quenching oscillator operation.

A sawtooth wave such as shown at 40 in Figure 2 may be derived from output terminals 46 connected across capacitor 34. A sinusoidal wave of variable amplitude as shown at 43 in Figure 2 may be derived from output terminals 47 connected between base electrode 23 and ground. This variable amplitude sine wave may of course be obtained in any other suitable manner from resonant circuit 25. It is to be understood that battery 35 and resistor 36 may be omitted so that emitter electrode 21 will be grounded. In that case a bias voltage of sufficient magnitude should be developed between base electrode 23 and ground. This bias voltage may be of the order of a few tenths of a volt.

Figure 3:
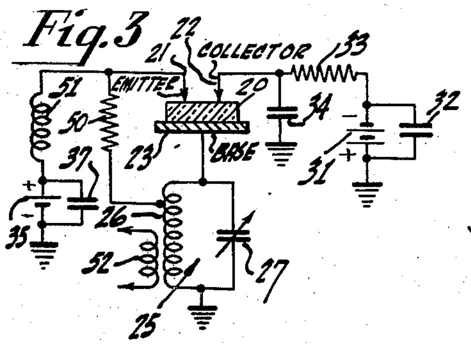
Figure 3 is a circuit diagram of a modified self-quenching oscillator in accordance with the invention having an external feedback path.

Figure 3 illustrates a self-quenching oscillator which mainly differs from that of Figure 1 by the provision of resistor 50 connected between emitter electrode 21 and a tap on inductor 26 of resonant circuit 25. Resonant circuit 25 is now preferably connected between base electrode 23 and ground. Resistor 36 of the oscillator of Figure 1 may be replaced by choke coil 51 connected between battery 35 and emitter electrode 21. The polarity of battery 35 will normally be reversed, as shown, in order to apply a forward bias voltage between emitter electrode 21 and base electrode 23 because now a voltage drop is developed across resistor 50.

The operation of the oscillator of Figure 3 is substantially the same as that of the oscillator of Figure 1. Resistor 50 provides an external feedback path between emitter electrode 21 and base electrode 23. Hence, the sine wave oscillator may be considered a Hartley oscillator. It is to be understood that the resistance of resistor 50 may be zero. However, resistor 50 will permit the oscillator to operate at higher frequencies by providing a phase shift between the alternating input and output currents. The phase shift network consists of resistor 50 and the interelectrode capacitance between emitter electrode 21 and base electrode 23. The resistance of resistor 50 may, for example, amount to 200 ohms. Battery 35 and choke coil 51 may again be omitted in which case the required bias is developed across resistor 50.

The variable amplitude sine wave may be obtained from inductor 52 inductively coupled to inductor 26 of resonant circuit 25.

Figure 4:
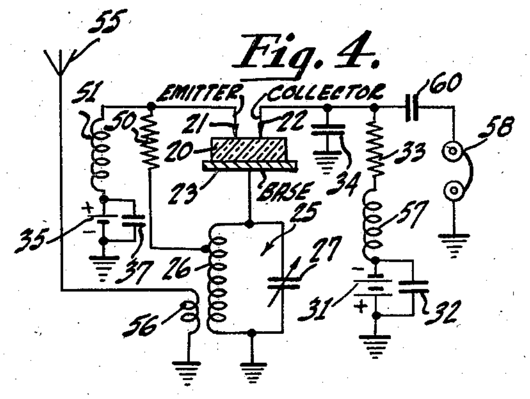
Figure 4 is a circuit diagram of a super-regenerative detector arranged as a receiver and embodying the invention.

Referring now to Figure 4, there is illustrated a super-regenerator receiver in accordance with the invention. An amplitude modulated wave is intercepted by antenna 55 and impressed through inductor 56 on parallel resonant circuit 25. Inductors 26 and 56 are inductively coupled. A choke coil 51 may again be provided between emitter electrode 21 and the positive terminal of battery 35. Another choke coil 57 may be inserted between battery 31 and resistor 33. An external feedback path is provided by resistor 50 between emitter electrode 21 and a tap of inductor 26. Headphones indicated at 58 are coupled to collector electrode 22 through coupling capacitor 60. The other terminal of headphones 50 is grounded and the headphones represent a high impedance reproducing device.

Figure 5:
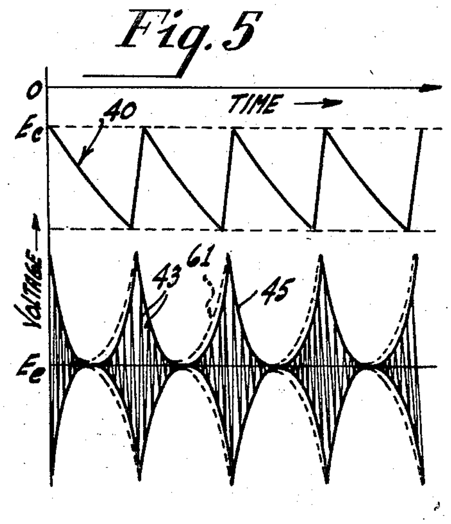
Figures 5 and 6 are graphs showing voltage curves which will be referred to in explaining the operation of the oscillator of Figure 4.

The super-regenerative receiver of Figure 4 essentially consists of a super-regenerative detector. The circuit of Figure 4 is believed to operate as follows. The quench frequency is determined by the time constant of resistor 33 and capacitor 34. The frequency of the amplitude modulated sine wave developed in circuit 25 is determined by the resonant frequency of circuit 25. The average collector current is modulated in accordance with the amplitude modulation of the impressed wave which contains the modulation signal. The frequency of the impressed wave should equal the resonant frequency of circuit 25. Curve 40 of Figure 5 again indicates the collector voltage $E_c$ in the absence of a carrier wave impressed on inductor 56. Curve 43 again indicates the sine wave developed in resonant circuit 25 also in the absence of a modulated carrier wave impressed thereon.

Solid curve 45 indicates the envelope of the sinusoidal wave 43.

Let it now be assumed that an amplitude-modulated carrier wave is impressed on resonant circuit 25. The resonant frequency of circuit 25 will equal the frequency of the impressed modulated carrier wave. It has now been found that the impressed carrier wave causes the sine wave 43 to be initiated earlier and to increase more rapidly in amplitude than without a carrier wave being impressed on circuit 25. The new envelope of sine wave 43 is shown at 61 in dotted lines. This increases the area defined by envelope 61 and the increase in area varies directly with the modulation of the impressed carrier wave.

Figure 6:
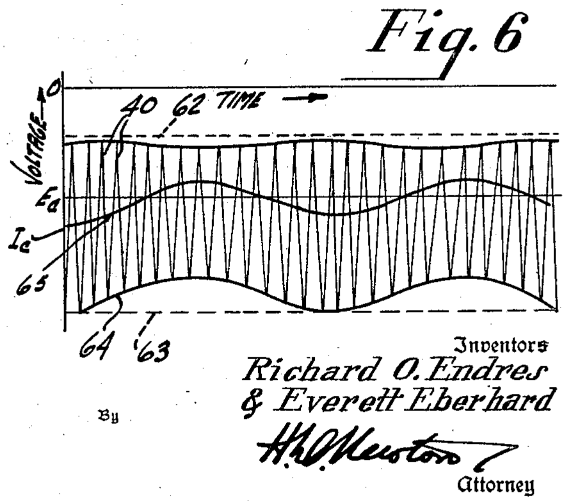

The effect of the modulation on the collector voltage $E_c$ is shown in Figure 6. Curve 40 again shows the sawtooth wave developed across capacitor 34. Dotted line 62 indicates the voltage at which the charge cycle normally starts without the application of a modulated carrier wave. Dotted line 63 indicates where regeneration normally occurs, that is, when capacitor 34 is normally discharged without the application of a modulated carrier wave. It will be noted that the impressed carrier wave causes the charge cycle to start somewhat earlier but the reason for this is not too well understood. However, it is believed that this is due to a variation of the base voltage. The modulation peaks of the applied modulated carrier cause the oscillator to reach its regenerative state earlier than without the application of a modulated carrier. The reason for this observed effect is simply that the large amplitude of the radio frequency voltage on the base electrode at the peak of the modulation envelope carries the circuit into its regenerative discharge sooner. This is clearly indicated by envelope 64 of sawtooth wave 40. Curve 64 varies with the modulation signal. The average collector current $I_c$ is shown by curve 65 and this current represents the modulation signal. This modulation signal, which is impressed through capacitor 60 on earphones 58, is reproduced by the earphones.

It is to be understood that the circuit of Figure 4 may be operated simply as a super-regenerative detector. However, the circuit as illustrated in Figure 4 has been found effective for receiving local broadcast stations. In the circuit of Figure 4 choke coils 51 and 57 may be omitted. Furthermore, resistor 50 may be omitted as has already been pointed out. Battery 35 may also be omitted provided sufficient self-bias is developed between emitter electrode 21 and base electrode 23.

While it will be understood that the circuit specifications of the super-regenerative receiver of Figure 4 may vary according to the design for any particular application, the following circuit specifications are included, by way of example only, as suitable for a quench frequency of 20 kc. (kilocycles) and for a resonant frequency of tank circuit 25 of between approximately .8 mc. and 1.5 mc.

| | |
|---|---|
| Resistor 33 ______ ohms __ | 10,000 |
| Capacitor 34 ______ micro-microfarads __ | 470 |
| Coupling Capacitor 60 ______ microfarads __ | .1 |
| Variable Capacitor 27 __ micro-microfarads __ | 30 to 325 |
| Inductor 26 ______ microhenries __ | 184 |
| Resistor 50 ______ ohms __ | 0 |
| Choke Coil 51 ______ henries __ | 0 |
| Choke Coil 57 ______ do ____ | 0 |
| Battery 35 ______ volts __ | 0 |

Figure 7:
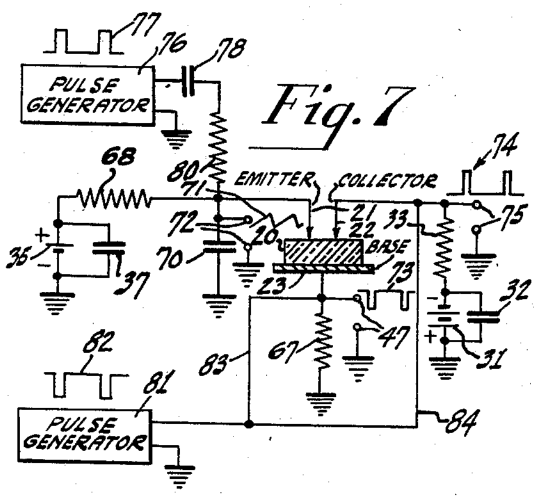
Figure 7 is a circuit diagram of a triggered relaxation oscillator of the invention.

Figure 7 illustrates a relaxation oscillator in accordance with the present invention. Base resistor 67 is provided between base electrode 23 and ground. Resistor 33 is provided between battery 31 and collector electrode 22. The positive terminal of battery 35 is connected to emitter electrode 21 through series resistor 68. Capacitor 70 is connected between emitter electrode and ground. In other words, the RC network is now connected to emitter electrode 21 instead of being connected to the collector electrode as illustrated in Figures 1 and 3. Furthermore, parallel resonant circuit 25 is replaced by resistor 67.

The relaxation oscillator of Figure 7 operates essentially in the manner previously disclosed. The oscillator is normally in its non-conducting state and during this time capacitor 70 is charged from battery 35 through resistor 68 in a positive direction. When the potential across capacitor 70 has reached a predetermined value, the oscillator discharges the capacitor. This may be explained by the negative resistance of the device which is due to the presence of base resistor 67. A sawtooth wave such as shown at 71 is developed across capacitor 70 and this wave may be derived from output terminals 72 connected across capacitor 70. Pulses of negative polarity such as shown at 73 are developed at base electrode 23 and pulses of positive polarity such as shown at 74 are developed at the collector electrode 22. These negative pulses may be derived from output terminals 47 connected between base electrode 23 and ground and the positive pulses from output terminals 75 connected between collector electrode 22 and ground.

It is also feasible to trigger or synchronize the relaxation oscillator of Figure 7. The trigger pulses should arrive slightly ahead of the time when capacitor 70 would normally be discharged. To this end, pulse generator 76 may be provided which develops positive pulses as illustrated at 77. One terminal of the pulse generator 77 is coupled to emitter electrode 21 through coupling capacitor 78 and resistor 80 across which the pulses are developed. Alternatively, trigger pulses of negative polarity may be impressed on either base electrode 23 or on collector electrode 22. To this end, pulse generator 81 may be provided for developing pulses of negative polarity indicated at 82. One terminal of pulse generator 81 may be connected through lead 83 to base electrode 23. Alternatively, the pulse generator may be connected to collector electrode 23 through lead 84. It is to be understood that pulse generators 76 and 81 are to be used alternatively.

The oscillator of Figure 8 is a modified self-quenching oscillator which is somewhat similar to the relaxation oscillator of Figure 7. However, base resistor 67 has been replaced by resonant circuit 25. Resonant circuit 25 may be inductively coupled to inductor 86 connected between base electrode 23 and ground as shown. The oscillator of Figure 8 further includes resistor 68 connected in series between battery 35 and emitter electrode 31 and capacitor 70 connected in shunt with resistor 68. A sinusoidal wave of varying amplitude may be derived from output terminals 47 connected between base electrode 23 and ground. Alternatively, an output signal may be derived in any suitable manner from resonant circuit 25.

Figure 9:
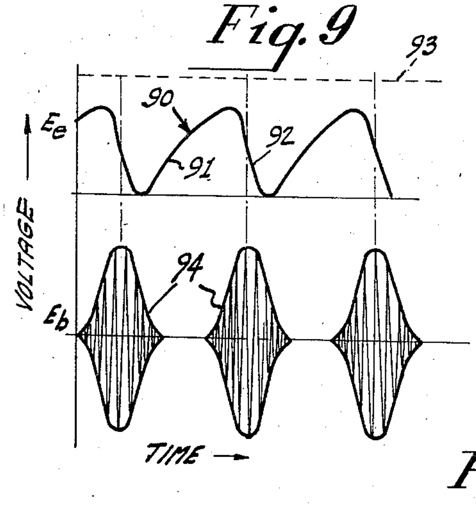
Figure 9 is a graph showing voltage curves which will be referred to in explaining the operation of the oscillator of Figure 8.

The self-quenching oscillator of Figure 8 operates in a manner similar to that of the oscillator of Figure 1. The emitter voltage $E_e$ is illustrated by curve 90 of Figure 9 and is identical to the potential across capacitor 70. Curve portion 91 illustrates the charging of capacitor 70 in a positive direction from battery 35 through resistor 68. Curve portion 92 shows the discharge of the capacitor. Dotted line 93 indicates the voltage of battery 35 which is positive with respect to ground. Capacitor 70 accordingly charges in a positive direction and is discharged in a negative direction. The sinusoidal waves indicated at 94 will be initiated in resonant circuit 35 at some point during the charging cycle of capacitor 70. Subsequently, the oscillation builds up to a maximum which is reached during some portion of the discharge cycle of the oscillator. Thereupon the oscillation decays again and may be reduced to zero as illustrated in Figure 9. However, depending upon the Q of resonant circuit 25, on the circuits constants of the oscillator as well as on the time constant of resistor 68 and capacitor 70, the sine wave oscillations 94 may also be continuous as shown in Figure 2. Curve 94 indicates the base voltage $E_b$ which is substantially the same as that across resonant circuit 25.

Figure 10:
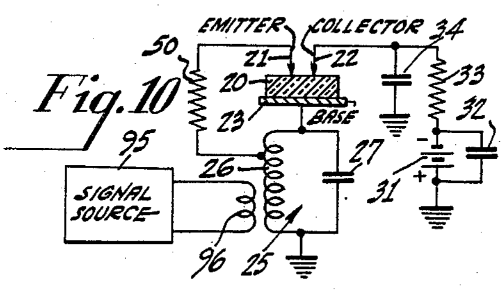
Figure 10 is a circuit diagram of a quenched oscillator where the quench frequency is determined by the frequency of a wave impressed on the oscillator.

Figure 10 illustrates a quenched oscillator, that is, an oscillator wherein the quench frequency is determined by the frequency of an impressed unmodulated carrier wave. The circuit of Figure 10 is essentially identical with the oscillator of Figure 3. It will be observed, however, that battery 35 and choke coil 51 have been omitted. Signal source 95 develops an unmodulated sinusoidal wave which appears on inductor 96 inductively coupled to inductor 26 of resonant circuit 25. The frequency of the wave developed by source 95 is different from the resonant frequency of parallel resonant circuit 25. Thus, by way of example, the resonant frequency of circuit 25 may amount to 1 mc. while the frequency of the wave developed by source 95 may be 1.05 mc. The quench frequency, however, is not necessarily the beat frequency of the two waves which would be 50 kc. However, at the present time no theory of operation of the quenched oscillator of Figure 10 can be presented.

Figure 11:
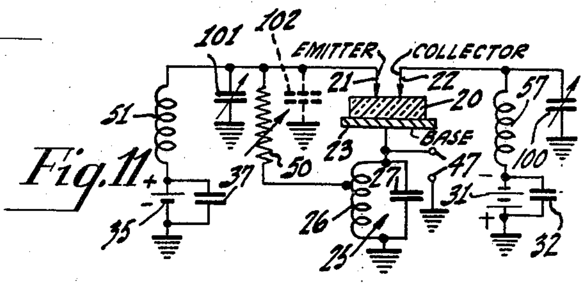
Figure 11 is a circuit diagram of a sine wave oscillator in accordance with the invention and suitable for high frequency operation.

Figure 11 illustrates a sine wave oscillator in accordance with the present invention having an external feedback path. Thus, the oscillator of Figure 11 is similar to that of Figure 3 but capacitor 34 has been omitted. Base electrode 23 is connected to ground through parallel resonant circuit 25. A tap on inductor 26 is connected to emitter electrode 21 through variable resistor 50. The positive terminal of battery 35 is connected to emitter electrode 21 through choke coil 51. Battery 31 is connected to collector electrode 22 through choke coil 57.

The oscillator as described would operate in the manner previously explained. Thus the oscillator of Figure 11 may be considered a Hartley oscillator.

It has been found that at high frequency operation there exists a phase shift between the alternating input and output currents of a semi-conductor amplifier. The same, of course, is true for a semi-conductor oscillator. This phase shift varies directly with frequency and becomes larger as the frequency increases. This phase shift is negative and becomes appreciable at 2 mc. and may be as large as 120 degrees or more as the frequency is increased beyond 2 mc. This phase shift, of course, will limit the upper frequency at which a semi-conductor amplifier or oscillator can be operated. This disadvantage can be overcome in accordance with the present invention by providing an external phase shift network either in the emitter lead or in the collector lead or in both leads for shifting the alternating voltage or current so that the output current and the input current will again be in phase. Since the output current lags the input current, an RC network may be provided for producing the required phase shift.

The phase shift occurring in the oscillator may be considered to be due to an inductive impedance in the oscillator device. This inductive impedance is believed to exist in the internal collector circuit and it may be compensated by a phase shift network in the external collector lead or in the external emitter lead as has already been pointed out. To this end, capacitor 100 may be provided between collector electrode 22 and ground. Capacitor 100 has been shown to be variable to correct for any occurring phase shift. For the same purpose, variable capacitor 101 may be provided between emitter electrode 21 and ground. Capacitor 101 cooperates with resistor 50 to provide a phase shift network. Capacitor 102 which has been shown in dotted lines, indicates the interelectrode capacitance between emitter electrode 21 and base electrode 23 or between emitter electrode 21 and collector electrode 22.

Figure 13:
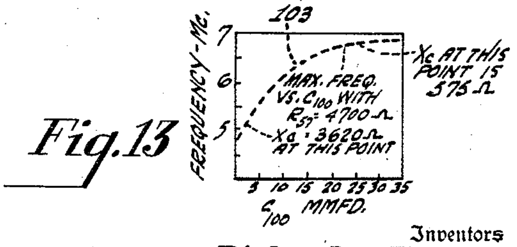

The effect of capacitor 100 is illustrated by curve 103 of Figure 13. It has been assumed that capacitor 101 and resistor 50 have been omitted. The curve 103 indicates the maximum oscillatory frequency which can be obtained for a given value of $C_{100}$ (capacitance of capacitor 100), if the resistance of coil 57 amounts to 4,700 ohms. It is to be understood that choke coil 57 may in that case be replaced by a resistor. The capacitive reactance $X_c$ of the capacitor 100 at two points of curve 103 has been indicated in Figure 13. It will be seen that the maximum oscillatory frequency may approach 7 mc.

Figure 12:
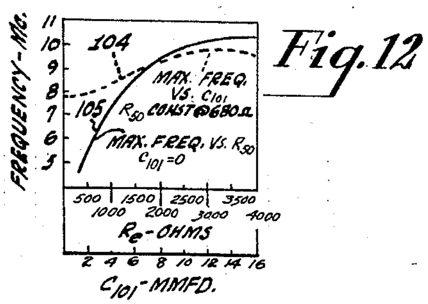
Figures 12 and 13 are graphs which will be referred to in explaining the operation of the oscillator of Figure 11.

Curve 104 of Figure 12 indicates the effect of capacitor 101 having a capacitance of $C_{101}$. In this case capacitor 100 has been omitted. As indicated in Figure 12, the resistance of $R_{50}$ of resistor 50 has a constant valve of 680 ohms. It will be seen that the effect of a variation of capacitor 101 is not very large which is due to the constant capacitance of capacitor 102. The curve 105 illustrates the effect of a variation of resistor 50, the capacitance of capacitor 101 being zero. The maximum oscillatory frequency which can be obtained with a suitable value of resistor 50 is over 10 mc.

It is to be understood that either capacitor 100 or capacitor 101 and resistor 50 may be omitted. Theoretically, the phase may be shifted by a phase shift network in the collector lead by 90° and the phase may be shifted by another 90° by a phase shift network in the emitter lead. Thus, the total phase shift may be made 180°. If a circuit is used as shown in Figure 11, the maximum oscillatory frequency is 14 mc. The sinusoidal output wave is preferably obtained from output terminals 47 connected between base electrode 23 and ground. The capacitance of capacitors 100 and 101 should be as low as possible to prevent self-quenching operation of the oscillator.

There have thus been disclosed various semi-conductor oscillators. Some of the oscillators are of the self-quenching type. By modification of the oscillator circuits a super-regenerative detector may be obtained or a quenched oscillator. Furthermore, a novel relaxation oscillator has been shown which may be triggered or synchronized by externally applied pulses. Finally, a novel sine wave oscillator has been disclosed which has provision for maintaining the input and output currents in phase thereby to obtain a higher oscillatory frequency than has previously been obtainable.

What is claimed is:

1. An oscillator comprising a semi-conductor device having a semi-conducting body, a base electrode in low-resistance contact with said body, two rectifying electrodes in contact with said body, one of said rectifying electrodes being the emitter electrode and the other one of said rectifying electrodes being the collector electrode, a parallel resonant circuit coupled to said base electrode, means including a source of voltage for applying a reverse bias voltage between said collector and base electrodes and for applying a forward bias voltage between said emitter and base electrodes, a resistor connected in series between a terminal of said source and one of said rectifying electrodes, and a capacitor connected effectively in shunt with said resistor between said one of said rectifying electrodes and the other terminal of said source, the time constant of said resistor and capacitor being longer than the reciprocal of the resonant frequency of said resonant circuit.

2. An oscillator comprising a semi-conductor device having a semi-conducting body, a base electrode in low-resistance contact with said body, two rectifying electrodes in contact with said body, one of said rectifying electrodes being the emitter electrode and the other one of said rectifying electrodes being the collector electrode, a parallel resonant circuit having an intermediate point connected to said base electrode, means including a source of voltage for applying a reverse bias voltage between said collector and base electrodes and for applying a forward bias voltage between said emitter and base electrodes, a resistor connected in series between a terminal of said source and one of said rectifying electrodes, a capacitor connected between said one of said rectifying electrodes and the other terminal of said source, and means for deriving a saw-tooth wave across said capacitor, the time constant of said resistor and capacitor being longer than the reciprocal of the resonant frequency of said resonant circuit.

3. A self-quenching oscillator comprising a semi-conductor device having a semi-conducting body, a base electrode, an emitter electrode and a collector electrode in contact with said body, a source of voltage having a point of reference potential, a resistor connected serially between said source and said collector electrode, said source being so poled and connected as to apply a reverse bias voltage between said collector and base electrodes, a capacitor connected between said collector electrode and said point of reference potential, and a parallel resonant circuit coupled to said base electrode, the time constant of said resistor and capacitor being long compared to the reciprocal of the resonant frequency of said resonant circuit.

4. A self-quenching oscillator comprising a semi-conductor device having a semi-conducting body, a base electrode in low-resistance contact with said body, an emitter electrode and a collector electrode in contact with said body, a source of voltage, a resistor connected serially between said source and said collector electrode, said source being so poled and connected as to apply a reverse bias voltage between said collector and base electrodes, a capacitor connected between said collector electrode and the free terminal of said source, a parallel resonant circuit having an intermediate point connected to said base electrode, means for applying a forward bias voltage between said base and emitter electrodes, and means for deriving a sinusoidal wave of varying amplitude from said resonant circuit, the time constant of said resistor and capacitor being long compared to the reciprocal of the resonant frequency of said resonant circuit.

5. A self-quenching oscillator comprising a semi-conductor device having a semi-conducting body, a base electrode, an emitter electrode and a collector electrode in contact with said body, a source of voltage having two terminals, a resistor connected serially between one terminal of said source and said collector electrode, said source being so poled and connected as to apply a reverse bias voltage between said collector and base electrodes, a capacitor connected between said collector electrode and the other terminal of said source, a parallel resonant circuit connected to said base electrode, and a circuit connection between an intermediate point of said resonant circuit and said emitter electrode, the time constant of said resistor and capacitor being long compared to the reciprocal of the resonant frequency of said resonant circuit.

6. A self-quenching oscillator comprising a semi-conductor device having a semi-conducting body, a base electrode, an emitter electrode and a collector electrode in contact with said body, a source of voltage having two terminals, a first resistor connected serially between one terminal of said source and said collector electrode, said source being so poled and connected as to apply a reverse bias voltage between said collector and base electrodes, a capacitor connected between said collector electrode and the other terminal of said source, a parallel resonant circuit connected to said base electrode, a second resistor connected between an intermediate point of said resonant circuit and said emitter electrode, and means for deriving a sinusoidal wave of periodically varying amplitude from said resonant circuit, the time constant of said first resistor and capacitor being long compared to the reciprocal of the resonant frequency of said resonant circuit.

7. A self-quenching oscillator comprising a semi-conductor device having a semi-conducting body, a base electrode, an emitter electrode and a collector electrode in contact with said body, a source of voltage having two terminals, a first resistor connected serially between one terminal of said source and said collector electrode, said source being so poled and connected as to apply a reverse bias voltage between said collector and base electrodes, a capacitor connected between said collector electrode and the other terminal of said source, a parallel resonant circuit connected to said base electrode, a second resistor connected between an intermediate point of said resonant circuit and said emitter electrode, and means for applying a forward bias voltage between said base and emitter electrodes, the time constant of said first resistor and capacitor being long compared to the reciprocal of the resonant frequency of said resonant circuit.

8. A self-quenching oscillator comprising a semiconductor device having a semi-conducting body, a base electrode in low-resistance contact with said body, an emitter electrode and a collector electrode in contact with said body, means for applying a reverse bias voltage between said collector and base electrodes, a resistor connected to said collector electrode, a source of voltage, a resistor connected serially between said source and said emitter electrode, said source being so poled and connected as to apply normally a forward bias voltage between said emitter and base electrodes, a parallel resonant circuit coupled to said base electrode, a capacitor connected between said emitter electrode and the free terminal of said source, and means for deriving a sinusoidal output wave of variable amplitude from said base electrode, the time constant of said second mentioned resistor and capacitor being long compared to the reciprocal of the resonant frequency of said resonant circuit.

9. A self-quenching oscillator comprising a semiconductor device having a semi-conducting body, a base electrode in low-resistance contact with said body, an emitter electrode and a collector electrode in contact with said body, means for applying a reverse bias voltage between said collector and base electrodes, a resistor connected to said collector electrode, a source of voltage, a resistor connected serially between said source and said emitter electrode, said source being so poled and connected as to apply normally a forward bias voltage between said emitter and base electrodes, an inductance element connected to said base electrode, a parallel resonant circuit coupled to said inductance element, the free terminals of said inductance element and of said source being connected together, a capacitor connected between said emitter electrode and said terminals, and means for deriving a sinusoidal output wave of variable amplitude across said inductance element, the time constant of said second mentioned resistor and capacitor being long compared to the reciprocal of the resonant frequency of said resonant circuit.

10. An oscillator comprising a semi-conductor device having a semi-conducting body, a base electrode, an emitter electrode and a collector electrode in contact with said body, a parallel resonant circuit coupled to said base electrode, means including a source of voltage having two terminals for applying a reverse bias voltage between said collector and base electrodes, a resistor connected in series between one terminal of said source and said collector electrode, a capacitor connected between said collector electrode and the other terminal of said source, the time constant of said resistor and capacitor being longer than the reciprocal of the resonant frequency of said resonant circuit, means for impressing a wave on said resonant circuit, and means for deriving an output signal from said oscillator.

11. A quenched oscillator comprising a semi-conductor device having a semi-conducting body, a base electrode in low-resistance contact with said body, an emitter electrode and a collector electrode in contact with said body, a parallel resonant circuit coupled to said base electrode, means including a source of voltage for applying a reverse bias voltage between said collector and base electrodes and for applying a forward bias voltage between said emitter and base electrodes, a resistor connected in series between said source and said collector electrode, a capacitor connected between said collector electrode and the free terminal of said source, the time constant of said resistor and capacitor being longer than the reciprocal of the resonant frequency of said resonant circuit, a connection between an intermediate point of said resonant circuit and said emitter electrode, means for impressing a carrier wave on said resonant circuit, the frequency of said wave being different from said resonant frequency, and means for deriving an output signal from said oscillator.

12. A quenched oscillator comprising a semi-conductor device having a semi-conducting body, a base electrode in low-resistance contact with said body, an emitter electrode and a collector electrode in contact with said body, a parallel resonant circuit coupled to said base electrode, means including a source of voltage for applying a reverse bias voltage between said collector and base electrodes and for applying a forward bias voltage between said emitter and base electrodes, a resistor connected in series between said source and said collector electrode, a capacitor connected between said collector electrode and the free terminal of said source, the time constant of said resistor and capacitor being longer than the reciprocal of the resonant frequency of said resonant circuit, a further resistor connected between an intermediate point of said resonant circuit and said emitter electrode, means for impressing a carrier wave on said resonant circuit, the frequency of said wave being different from said resonant frequency, and means for deriving an output signal from said oscillator.

13. A super-regenerative detector comprising an oscillator, said oscillator including a semi-conductor device having a semi-conducting body, a base electrode, in low-resistance contact with said body, an emitter electrode and a collector electrode in contact with said body, a source of voltage having two terminals, a resistor connected serially between one terminal of said source and said collector electrode, said source being so poled and connected as to apply a reverse bias voltage between said collector and base electrodes and for applying a forward bias voltage between said emitter and base electrodes, a capacitor connected between said collector electrode and the other terminal of said source, a parallel resonant circuit coupled to said base electrode, the time constant of said resistor and capacitor being long compared to the reciprocal of the resonant frequency of said resonant circuit, means for impressing an amplitude-modulated carrier wave on said resonant circuit, and a high impedance reproducing device coupled to said collector electrode for reproducing the modulation frequency signal of said carrier wave, the resonant frequency of said resonant circuit being equal to the frequency of said carrier wave.

14. A super-regenerator detector comprising an oscillator, said oscillator including a semi-conductor device having a semiconducting body, a base electrode in low-resistance contact with said body, an emitter electrode and a collector electrode in contact with said body, a source of voltage having two terminals, a resistor connected serially between one of the terminals of said source and said collector electrode, said source being so poled and connected as to apply a reverse bias voltage between said collector and base electrodes, and for applying a forward bias voltage between said emitter and base electrodes, a capacitor connected between said collector electrode and the other terminal of said source, a parallel resonant circuit connected to said base electrode, a conductive connection between an intermediate point of said resonant circuit and said emitter electrode, the time constant of said resistor and capacitor being long compared to the reciprocal of the resonant frequency of said resonant circuit, means for impressing an amplitude-modulated carrier wave on said resonant circuit, and a high impedance reproducing device coupled to said collector electrode for reproducing the modulation frequency signal of said carrier wave, the resonant frequency of said resonant circuit being equal to the frequency of said carrier wave.

15. A super-regenerator receiver comprising an oscillator, said oscillator including a semi-conductor device having a semi-conducting body, a base electrode in low-resistance contact with said body, an emitter electrode and a collector electrode in contact with said body, a source of voltage having two terminals, a first resistor connected serially between one of the two terminals of said source and said collector electrode, said source being so poled and connected as to apply a reverse bias voltage between said collector and base electrodes and for applying a forward bias voltage between said emitter and base electrodes, a capacitor connected between said collector electrode and the other terminal of said source, a parallel resonant circuit connected to said base electrode, a second resistor connected between an intermediate point of said resonant circuit and said emitter electrode, the time constant of said first resistor and capacitor being long compared to the reciprocal of the resonant frequency of said resonant circuit, an antenna for intercepting an amplitude-modulated carrier wave, said antenna being coupled to said resonant circuit for impressing said carrier wave thereon, and a high impedance reproducing device coupled to said collector electrode for reproducing the modulation frequency signal of said carrier wave, the resonant frequency of said resonant circuit being equal to the frequency of said carrier wave.

References Cited in the file of this patent

UNITED STATES PATENTS 2,476,323 Rack ------------------ July 19, 1949

OTHER REFERENCES

"Radio & Television News," October 1948, pages 39, 182 and 183.

"Radio-Craft," September 1948, pages 24 and 25, vol. XIX, No. 12.

"Effect of Temperature on Frequency of 6J5 Oscillator"; application note No. 108, Nov. 13, 1940, RCA Mfg. Co.

"Some Novel Circuits for the Three Terminal Semiconductor Amplifier"; RCA Review, March 1949, pages 5 to 16.